United States Patent [19]

McCaffrey et al.

[11] 4,291,004

[45] Sep. 22, 1981

[54] PROCESS FOR REMOVING SULFUR DIOXIDE FROM FLUE GAS

[75] Inventors: Craig R. McCaffrey, Woodbury; Gary O. Barraclough, Vincentown, both of N.J.

[73] Assignee: Betz Laboratories, Inc., Trevose, Pa.

[21] Appl. No.: 79,672

[22] Filed: Sep. 28, 1979

[51] Int. Cl.$^3$ ............................................. C01B 17/00
[52] U.S. Cl. .................................. 423/242; 210/732; 423/243
[58] Field of Search ............... 423/242 A, 242 R, 243, 423/244 A, 244 R; 210/732

[56] References Cited

U.S. PATENT DOCUMENTS

| | | | |
|---|---|---|---|
| 2,073,039 | 3/1937 | Wilton et al. | 423/242 |
| 2,090,142 | 8/1937 | Ronhebel et al. | 423/242 |
| 2,266,954 | 12/1941 | Bonnet et al. | 210/42.5 |
| 2,302,338 | 11/1947 | Moeller et al. | 252/61 |
| 2,719,118 | 9/1955 | Bernard et al. | 210/2 |
| 2,864,765 | 12/1958 | Stoneman et al. | 210/43 |
| 2,952,620 | 9/1960 | Wade | 208/162 |
| 2,975,123 | 3/1961 | Head | 210/43 |
| 3,151,137 | 9/1964 | Young et al. | 260/403 |
| 3,194,758 | 7/1965 | Lissant | 210/54 |
| 3,240,819 | 3/1966 | Gaertner et al. | 260/615 |
| 3,625,909 | 12/1971 | Berg et al. | 252/153 |
| 3,756,959 | 9/1973 | Vitalis et al. | 252/336 |
| 3,849,347 | 11/1974 | Tokiwa et al. | 252/545 |
| 3,865,718 | 2/1975 | Tueter et al. | 209/166 |
| 3,868,336 | 2/1975 | Mazzola et al. | 252/527 |
| 3,914,185 | 10/1975 | Inamorato | 252/546 |
| 3,925,244 | 12/1975 | Winston | 252/89 |
| 3,983,078 | 9/1976 | Collins | 252/540 |
| 4,097,390 | 12/1978 | Wang et al. | 252/60 |
| 4,156,649 | 5/1979 | Quinn et al. | 210/51 |

FOREIGN PATENT DOCUMENTS

| | | |
|---|---|---|
| 544858 | 8/1957 | Canada . |
| 2079968 | 12/1971 | France . |
| 47-20075 | 2/1971 | Japan . |

OTHER PUBLICATIONS

Application of Flue Gas Desulfurization to Industrial Boilers, Delleney et al., Jun. 1978.

*Primary Examiner*—O. R. Vertiz
*Assistant Examiner*—Gregory A. Heller
*Attorney, Agent, or Firm*—Alexander D. Ricci; Bruce E. Peacock

[57] ABSTRACT

A process for removing sulfur dioxide from flue gas is disclosed which utilizes, as a scrubber sludge dewatering aid, polyethylene oxide or derivative thereof.

21 Claims, No Drawings

PROCESS FOR REMOVING SULFUR DIOXIDE FROM FLUE GAS

TECHNICAL FIELD

A common problem faced in industry today is the removal of sulfur dioxide, an environmental pollutant formed by the oxidation of sulfur or sulfur-containing substances, from industrial exhaust gases. This pollutant is found as a component in various waste gases such as blast furnace gases, emission gases from certain chemical factories, and flue gases from coal or oil-burning furnaces used in industrial and utility plants.

One widely accepted flue gas desulfurization (FGD) method for attacking this problem involves the use of wet scrubber systems in which sulfur dioxide-containing gases are intimately contacted with scrubbing liquor; e.g., an aqueous slurry of lime and fly ash. The scrubbing liquor is selective for sulfur dioxide due to the presence therein of certain chemicals such as lime or limestone. When the sulfur dioxide-containing gas is contacted with the scrubbing liquor, these noted chemicals react with the sulfur dioxide to form a sulfite-containing reaction product which remains with the liquor; and the resulting relatively sulfur dioxide-free flue gas passes on through the process stream.

One major type of wet scrubber system for removing sulfur dioxide is known as the "limestone slurry system" in which scrubbing liquor contains limestone as a sulfur dioxide-selective chemical. Upon contacting the exhaust gas with the limestone slurry, sulfur dioxide is removed according to the reaction:

$$CaCO_3 + SO_2 + \tfrac{1}{2}H_2O \rightarrow CaSO_3 \cdot \tfrac{1}{2}H_2O + CO_2 \qquad (1)$$

A second major type of wet scrubber system used for flue gas desulfurization is the "double-alkali system" which contains a scrubbing loop and a separate precipitation loop. This system utilizes a sodium based scrubbing loop in which sulfur dioxide is removed from exhaust gas according to:

$$Na_2SO_3 + SO_2 + H_2O \rightarrow 2NaHSO_3 \qquad (2)$$

If sodium hydroxide is also used, sulfur dioxide is removed according to:

$$2NaOH + 2SO_2 \rightarrow 2NaHSO_3 \qquad (3)$$

In the precipitation loop, the spent scrubbing liquor is regenerated by treatment with lime and soda ash to precipitate the sulfite reaction product according to:

$$2NaHSO_3 + Ca(OH)_2 \rightarrow CaSO_3 + Na_2SO_3 + 2H_2O \qquad (4)$$

A significant problem related to these FGD processes is the enormous amount of low solids content waste, known as sludge, generated. The principal constituents of this sludge are calcium sulfite and calcium sulfate. Varying amounts of calcium carbonate, unreacted lime, inerts and fly ash can also be present. Unless properly treated, scrubber sludge can cause water pollution and damage to the environment. Also of importance is the fact that costs of transportation of enormous volumes of sludge to a disposal landfill can be—and often are—tremendous.

To prevent damage to the environment, the sludge must often be chemically stabilized. Lime and fly ash are presently the most predominant chemical additives for calcium-based FGD sludge. The ability to stabilize waste solids from FGD wet scrubbers is a strong function of the moisture content of the solids. As the solids content of the sludge increases, the void ratio decreases producing a material with a higher dry density. Smaller quantities of stabilizing additives are required to harden sludge with low void ratios because the particles are in closer proximity to react with each other and the hardening agent. In addition, drier mixtures that are close to their optimum moisture content for compaction can be placed in a landfill at much higher densities than wet sludges.

Due to the large volumes of sludge generated in these FGD processes, transportation costs for disposal purposes are indeed significant. Since the sludge contains a major proportion of water, sludge dewatering can lead to savings in costs for transportation. In fact, even small decreases in the moisture content of sludge can result in significant economic benefits.

To avoid the unnecessary discharge of large amounts of process liquor, sludge is almost universally given primary dewatering treatment before discharge from the process system. Primary dewatering is usually accomplished using thickener/clarifiers or settling ponds. Secondary dewatering methods are sometimes used and include vacuum filtration and centrifugation. Secondary dewatering is commonly employed as a precursor to dry impoundment so as to improve handling properties of the sludge prior to truck transportation or stabilization.

Despite the use of primary and secondary dewatering processes as described above, the treated sludge still has a relatively high moisture content. Accordingly, the need exists for methods to improve sludge dewatering.

DESCRIPTION OF THE INVENTION

The present invention is drawn to an improved flue gas desulfurization process according to which in sequence:

(1) flue gas is wet scrubbed to remove sulfur dioxide therefrom, thus generating scrubber sludge, (2) the scrubber sludge is subjected to primary dewatering, (3) the scrubber sludge is treated with a dewatering aid (as described in detail below), and (4) the sludge is subjected to secondary dewatering. The use of a dewatering aid according to the present invention was found to significantly decrease the moisture (water) content of the generated sludge. Accordingly, sludge transportation costs are decreased and the solid waste should be more easily stabilized.

The dewatering aid is best described as polyethylene oxide compound and is intended to include derivatives and mixtures of such compounds. For example, not only did polyethylene glycol demonstrate scrubber sludge dewatering efficacy, but various ethoxylated surfactants also proved to be suitable for the purpose. The ethylene oxide (EO) constituent of the compounds in accordance with the present invention can be either a single EO chain or a distribution of EO units among multiple addition sites (e.g., polyoxyethylene sorbitan monooleate or polyoxyethylene soya amine).

Preferred polyethylene oxide compounds can be represented by the formula:

$$R\text{-}[CH_2CH_2\text{-}O]_x H, \qquad (I)$$

where X is about 2 to 40 and R is OH; sorbitan monooleate— O—; soya amine;

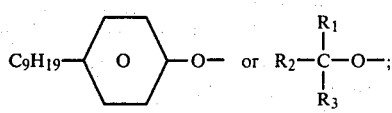

where $R_1$, $R_2$ and $R_3$ are selected from the group consisting of hydrogen and alkyl such that the sum of the total number of carbon atoms in $R_1$, $R_2$ and $R_3$ is an average of from about 10 to 20. In formula (1) X is preferably about 3 to 15.

The most preferred polyethylene oxide compounds in accordance with the present invention are represented by the formula:

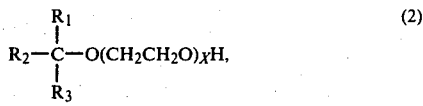

where $R_1$, $R_2$ and $R_3$ are selected from the group consisting of hydrogen and alkyl such that the sum of the total number of carbon atoms in $R_1$, $R_2$ and $R_3$ is from about 8 to 20 and X is from about 1 to 10. The value of X in formula (2) is preferably from about 2 to 5, and the preferred number of carbon atoms in $R_1$, $R_2$ and $R_3$ is about 10 to 15.

While dewatering aid in accordance with the present invention could be fed neat using any well known method of feeding, its use with liquid hydrocarbon solvent is preferred. Illustrative examples of liquid hydrocarbon solvents for use in practicing the present invention are kerosene, odorless kerosene, heavy aromatic naphtha (H.A.N.) and naphthenic process oil. Kerosene is the most preferred solvent, particularly when used with polyethylene oxide having the formula $C_{13}H_{27}O(CH_2CH_2O)_3H$. The concentration of the dewatering aid in solution could vary over a wide range and could be from about 10% to 90% (weight basis).

The amount of dewatering aid added could vary over a wide range and would depend on such known factors as the nature and severity of the problem being treated. It is believed that amounts as low as about 0.5 pound of active dewatering aid/ton of sludge could be used. About 1 pound of dewatering aid/ton of sludge is the preferred lower limit; while about 2 pounds/ton is most preferred. Based on economic considerations, the amount of dewatering aid could be as high as about 15 pounds/ton of sludge. While about 10 pounds/ton is the preferred maximum dosage, about 5 pounds/ton is most preferred. For best results, the dewatering aid should be added just prior to the secondary dewatering stage of the sludge treatment system. Particularly good results have been observed when it is added just prior to a vacuum filter.

TEST PROCEDURE

For the evaluations described below, the laboratory procedures (including equipment) used were well-known filtration leaf test procedures as specifically described in Bulletin No. 251 LT, "Filtration Leaf Test Procedures," published by Dorr-Oliver Corporation, Stamford, CT.

Instead of using a standard test leaf in the filter leaf assembly, a scaled-down version was used. It was found that the bottom portion of a millipore filter (#4616-H25 A. H. Thomas) would serve as the base. A six hole pattern was drilled (random spacing) in the base, and channels connecting the filtration holes were etched. The appropriate filter cloth was fitted on top and clamped in position via a hose clamp (1.5 inch I.D.). The area of the miniature leaf was calculated to be 15.9 square centimeters as compared to 95.03 square centimeters for the industrial filter leaf. In side-by-side comparisons with the standard leaf, the scaled-down version proved to be equal in performance with respect to evaluating dewatering aids. With the smaller leaf, smaller sample sizes could be used in the tests.

The procedure used in evaluating numerous compounds and compositions for sludge dewatering aid efficacy was substantially as follows:

1. The equipment was assembled as indicated in the Dorr-Oliver publication.
2. A fresh sample of scrubber sludge concentrate was placed in a standard mixer; and, if necessary, the percent solids adjusted with water.
3. The vacuum hose was sealed, and the vacuum in the system was adjusted to the desired value (in inches of mercury) by adjusting the air bleed valve.
4. The mixer containing the concentrate was halted and a sample of the desired size was quickly poured into a sludge container. The mixer was then restarted.
5. The variable speed mixer was inserted into the container and the speed was adjusted to a rate which will keep the concentrate solids in suspension.
6. A timer which controls the operation of the vacuum pump was set for the appropriate time, e.g., 1 minute and 40 seconds (for 30 second cake formation time), and started.
7. At 1 minute and 30 seconds on the timer (10 seconds elapsed), the filter test leaf was immersed into the concentrate slurry until the bushing was just covered.
8. The desired cake formation time, for example, 30 seconds, is provided. At the appropriate time on the timer, e.g., 1 minute if one minute drying time is desired, the filter test leaf was rotated out of the concentrate and was hung upon the drying platform.
9. The desired drying time was provided, e.g., one minute, at which point the timer automatically turned off the vacuum pump.
10. The filter test leaf was removed from the vacuum base and a thin blade spatula was used to loosen the edge of the filter cake on the inside of the compression ring. The filter cake can then be transferred to a paper towel by gently blowing into the hose adapter. Any filter cake which adhered to the filter cloth was removed with a spatula.
11. The filter leaf assembly was washed with tap water, using a stiff-bristled brush if necessary, to remove any adherent material.
12. The wet filter cake and paper towel were weighed to the nearest 0.1 gram on a balance which had been tared for the weight of the paper towel. The wet weight of the filter cake was recorded as $W_w$.
13. The wet filter cake was then transferred to drying apparatus and sufficient time was provided to dry the cake to constant weight.
14. The dried filter cake was then weighed upon a balance which had been tared for the weight of the paper towel. The dry weight was recorded as $W_d$.
15. Percent moisture in the filter cake was calculated using the following formula:

$\% \text{ moisture} = (W_w - W_d/W_w) \times 100.$

16. Filter leaf tests were run in duplicate.

17. The sludge concentrate was then treated with the appropriate amount of dewatering aid being tested, stirred to insure the necessary mixing into the concentrate and steps 5 through 16 were repeated.

Sludge samples for use in the evaluations were obtained from various industrial FGD wet scrubber systems. Chemical analysis of two sludge samples yielded the following illustrative sludge compositions, reported as weight percent of each constituent:

TABLE I

| ILLUSTRATIVE CHEMICAL ANALYSES OF SLUDGE SAMPLES | | |
|---|---|---|
| SAMPLE DESIGNATION | SLUDGE I | SLUDGE II |
| Loss on ignition | 7 | 4 |
| Sulfur, as S, $SO_2$, $SO_3$ | 23* | 25* |
| Sodium, as $Na_2O$ | 4 | 5 |
| Aluminum, as $Al_2O_3$ | 4 | 4 |
| Silicon, as $SiO_2$ | 15 | 15 |
| Calcium, as CaO | 39 | 39 |
| Vanadium, as $V_2O_5$ | 1 | — |
| Iron, as $Fe_2O_3$ | 7 | 5 |
| Carbonate, as $CO_2$ | — | 1 |
| Phosphorous, as $P_2O_5$ | — | 1 |
| Potassium, as $K_2O$ | — | 1 |

*Sulfur - Mixed oxidation state

The materials tested are all commercially available and are chemically described below in Table II. Where solutions are indicated, 50% (actives on weight basis) solutions were used.

TABLE II

| CHEMICAL DESCRIPTIONS OF PRODUCTS EVALUATED | | |
|---|---|---|
| PRODUCT DESIGNATION | CHEMICAL DESCRIPTION | SOLVENT |
| 1 | $C_{12}$-$C_{13}$ linear, primary alcohol ethoxylate, 3 moles of ethoxylation | H.A.N. |
| 2 | Same as 1 | Kerosene |
| 3 | Same as 1 | — |
| 4 | $C_{12}$-$C_{15}$ linear primary alcohol ethoxylate, 7 moles of ethoxylation | — |
| 5 | $C_9$-$C_{11}$ linear, primary alcohol ethoxylate, 2.5 moles of ethoxylation | — |
| 6 | $C_9$-$C_{11}$ linear primary alcohol ethoxylate, 8 moles of ethoxylation | — |
| 7 | $C_{15}$ polyethylene glycol ether of secondary alcohol, 3 moles of ethoxylation | — |
| 8 | Coco amido sulfobetaine | — |
| 9 | $C_{12}$-$C_{15}$ polyethylene glycol ether of primary alcohol, 7 moles of ethoxylation | — |
| 10 | Nonylphenol polyethylene glycol ether, 40 moles of ethoxylation | — |
| 11 | Linear alkylate sulfonic acid | H.A.N. |
| 12 | Polyethylene glycol, molecular wt. = 200 | H.A.N. |
| 13 | Polyoxyethylene sorbitan monooleate, 5 moles of ethoxylation | Kerosene |
| 14 | Isopropylamine sulfonate | H.A.N. |
| 15 | Ethylene oxide condensation product of stearic amine | Kerosene |
| 16 | Potassium salt of complex organic polyphosphoric ester acid anhydride | Kerosene |

The kerosene solvent was available from Phillips Petroleum Company under the trademark Soltrol 145.

Evaluations were conducted to determine the dewatering aid efficacy, if any, of the products described above in Table II. The results of these tests are reported below in Tables III-VII in terms of % decrease in sludge moisture content as compared to a blank run (no treatment added), as defined by:

$$\% \text{ decrease} = \frac{\% \text{ Moisture}_B - \% \text{ Moisture}_T}{\% \text{ Moisture}_B} \times 100$$

where:

% decrease = % decrease in sludge moisture content,
% Moisture$_B$ = moisture content of sludge in blank run, and
% Moisture$_T$ = moisture content of sludge in treated run.

The conditions of each test are provided at the head of each table. The solids indicated represent the solids content (weight %) of the sludge sample and the ML/Series noted represent the size of the sample used in the test. The remaining conditions are self-explanatory. The product designations in the tables are, of course, taken from Table II. The treatment dosages are reported as pounds of product/ton of sludge.

TABLE III

| Solids: | 37.4% | | |
|---|---|---|---|
| Vacuum: | 14" Hg | | |
| ML/Series: | 200 ml | | |
| Pickup time: | 20 Seconds | | |
| Drying time: | 30 Seconds | | |

| PRODUCT DESIGNATION (FROM TABLE II) | DOSAGE OF TREATMENT (POUNDS/ TON) | % MOISTURE | % DECREASE IN MOISTURE |
|---|---|---|---|
| — | — | 47.7* | — |
| 2 | 1 | 46.6 | 2.3 |
| 11 | 1 | 47.1 | 1.3 |
| 12 | 1 | 45.6 | 4.4 |
| 13 | 1 | 46 | 3.6 |
| 14 | 1 | 47.6 | 0.2 |
| 15 | 1 | 47.4 | 0.6 |
| 16 | 1 | 47.5 | 0.4 |
| 8 | 1 | 47.7 | 0 |

*Average value for 4 blank runs (all values ± 0.4)

The sludge samples used in the tests reported in Table III were obtained from a FGD wet scrubber system which used high dolomite lime. As will be readily discernible from a comparison of Table III results with the results of the following tables, magnesium oxide-based lime in the scrubbing liquor apparently decreases the efficacy of the dewatering aids.

TABLE IV

| Solids: | 37.4% | | |
|---|---|---|---|
| Vacuum: | 14" Hg | | |
| ML/Series: | 200 ml | | |
| Pickup time: | 20 Seconds | | |
| Drying time: | 30 Seconds | | |

| PRODUCT DESIGNATION (FROM TABLE II) | DOSAGE (POUNDS/ TON) | % MOISTURE | % DECREASE IN MOISTURE |
|---|---|---|---|
| — | — | 46.7* | — |
| 2 | 2 | 44 | 5.8 |
| 12 | 2 | 44.5 | 4.7 |
| 13 | 2 | 43.5 | 6.9 |
| 15 | 2 | 45.7 | 2.1 |
| 16 | 2 | 46.4 | 0.6 |

*Average value of 2 blank runs

TABLE V

| | Solids: | 18.1% | |
|---|---|---|---|
| | Vacuum: | 14" Hg | |
| | ML/Series: | 200 ml | |
| | Pickup time: | 20 Seconds | |
| | Drying time: | 30 Seconds | |

| PRODUCT DESIGNATION (FROM TABLE II) | DOSAGE (POUNDS/ TON) | % MOISTURE | % DECREASE IN MOISTURE |
|---|---|---|---|
| — | — | 53.1* | — |
| 2 | 2 | 46.0 | 13.4 |
| 2 | 2 | 46.8 | 11.9 |
| 1 | 2 | 46.4 | 12.6 |
| 1 | 2 | 46.1 | 13.2 |
| 12 | 2 | 49.2 | 7.3 |
| 12 | 2 | 49.5 | 6.8 |
| 13 | 2 | 49.8 | 6.2 |
| 13 | 2 | 50.2 | 5.5 |
| 15 | 2 | 51.4 | 3.2 |
| 15 | 2 | 51.0 | 4.0 |
| 16 | 2 | 52.9 | 0.4 |
| 16 | 2 | 52.3 | 1.5 |
| 2 | 0.5 | 52.2 | 1.7 |
| 2 | 0.5 | 52.3 | 1.5 |
| 2 | 1 | 51.0 | 4.0 |
| 2 | 1 | 51.6 | 2.8 |
| 2 | 1.5 | 48.6 | 8.5 |
| 2 | 1.5 | 49.4 | 7.0 |
| 2 | 2 | 44.1 | 16.9 |
| 2 | 2 | 44.6 | 16.0 |

TABLE VI

| | Solids: | 30.9% | |
|---|---|---|---|
| | Vacuum: | 14" Hg | |
| | ML/Series: | 200 ml | |
| | Pickup time: | 20 Seconds | |
| | Drying time: | 30 Seconds | |

| PRODUCT DESIGNATION (FROM TABLE II) | DOSAGE (POUNDS/ TON) | % MOISTURE | % DECREASE IN MOISTURE |
|---|---|---|---|
| — | — | 50.4* | — |
| 12 | 2 | 49.9 | 1.0 |
| 12 | 2 | 49.7 | 1.4 |
| 2 | 1 | 50.0 | 0.8 |
| 2 | 1 | 49.7 | 1.4 |
| 2 | 2 | 47.7 | 5.4 |
| 2 | 2 | 47.4 | 6.0 |
| 2 | 3 | 45.7 | 9.3 |
| 2 | 3 | 43.5 | 13.7 |

*Average value for 2 blank runs (values ±0.2)

TABLE VII

| | Solids: | 21.9% | |
|---|---|---|---|
| | Vacuum: | 20" Hg | |
| | ML/Series: | 200 ml | |
| | Pickup time: | 30 Seconds | |
| | Drying time: | 30 Seconds | |

| PRODUCT DESIGNATION (FROM TABLE II) | DOSAGE (POUNDS/ TON) | % MOISTURE | % DECREASE IN MOISTURE |
|---|---|---|---|
| — | — | 47.6* | — |
| 1 | 5 | 45.7 | 4.0 |
| 1 | 5 | 44.4 | 6.7 |
| 2 | 5 | 42.1 | 11.6 |
| 2 | 5 | 41.7 | 12.4 |
| 3 | 2.5 | 43.1 | 9.5 |
| 3 | 2.5 | 42.1 | 11.6 |
| 4 | 5 | 43.6 | 8.4 |
| 4 | 5 | 42.7 | 10.29 |
| 5 | 5 | 47.9 | −0.63 |
| 5 | 5 | 45.1 | 5.25 |
| 6 | 5 | 45.7 | 4.0 |
| 6 | 5 | 46.7 | 1.9 |
| 7 | 5 | 46.8 | 1.7 |
| 7 | 5 | 43.0 | 10.0 |
| 9 | 5 | 45.7 | 4.0 |
| 9 | 5 | 43.4 | 8.8 |
| 10 | 5 | 42.1 | 11.6 |
| 10 | 5 | 43.9 | 7.8 |

*Average value of 4 blank runs (values ±1.5)

As can be seen from the above results, the polyethylene oxides (including various and sundry derivatives) used in practicing the inventive method demonstrated significant efficacy as sludge dewatering aids. The other materials tested were considered ineffective for the purpose.

Compounds represented by formula (2) above have been known to be useful as mineral ore dewatering aids. However, the fact that a compound is effective as a mineral ore dewatering aid by no means makes it obvious to use for dewatering scrubber sludge. Quite to the contrary, although Products, 11, 14 and 16 in Table II above proved in tests to be effective mineral ore dewatering aids, these compounds were found to be ineffective for use in dewatering scrubber sludge.

A preferred composition for use in practicing the present invention is a 50% solution of polyethylene oxide derivative having the formula $C_{13}H_{27}O(CH_2CH_2O)_3H$ in kerosene.

Having thus described our invention, we claim:

1. A flue gas desulfurization process comprising in sequence:
   (1) contacting sulfur dioxide-containing flue gas with scrubbing liquor to remove sulfur dioxide therefrom and produce scrubber sludge,
   (2) subjecting said scrubber sludge to primary dewatering,
   (3) adding to said scrubber sludge an effective amount as a dewatering aid of polyethylene oxide compound having the formula

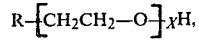

where X is about 2–40 and R is OH, sorbitan monooleate—O—, soya amine,

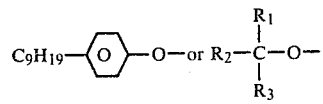

where $R_1$, $R_2$ and $R_3$ are selected from the group consisting of hydrogen and alkyl such that the sum of the total number of carbon atoms in $R_1$, $R_2$ and $R_3$ is an average of from about 8 to 20, and
   (4) subjecting said scrubber sludge to secondary dewatering.

2. The process of claim 1, wherein said dewatering aid is added in a liquid hydrocarbon solvent and is added in an amount of from about 0.5 pound to about 15 pounds/ton of scrubber sludge.

3. The process of claim 2, wherein X is about 3–15.

4. The process of claim 3, wherein said primary dewatering step comprises treating said scrubber sludge in a thickener.

5. The process of claim 4, wherein said secondary dewatering comprises vacuum filtration.

6. The process of claim 5, wherein said flue gas is produced by an industrial boiler and wherein said scrubbing liquor comprises an aqueous slurry of lime and fly ash.

7. The process of claim 6, wherein said dewatering aid is added in an amount of from about 2 pounds to about 5 pounds/ton of scrubber sludge, and wherein said liquid hydrocarbon solvent is kerosene.

8. The process of claim 3 or 7, wherein said scrubber sludge comprises an aqueous slurry of calcium sulfate, calcium sulfite and fly ash.

9. A flue gas desulfurization process comprising in sequence:
 (1) contacting sulfur dioxide-containing flue gas with scrubbing liquor to remove sulfur dioxide therefrom and produce scrubber sludge,
 (2) subjecting said scrubber sludge to primary dewatering,
 (3) adding to said scrubber sludge an effective amount as a dewatering aid of polyethylene oxide compound having the formula:

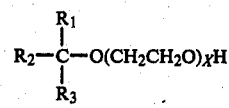

where $R_1$, $R_2$ and $R_3$ are selected from the group consisting of hydrogen and alkyl such that the sum of the total number of carbon atoms in $R_1$, $R_2$ and $R_3$ is from about 8 to 20 and X is from about 1 to 10, and
 (4) subjecting said scrubber sludge to secondary dewatering.

10. The process of claim 9, wherein said dewatering aid is added in liquid hydrocarbon solvent and is added in an amount of from about 0.5 pound to about 15 pounds/ton of scrubber sludge.

11. The process of claim 10, wherein said primary dewatering step comprises treating said scrubber sludge in a thickener.

12. The process of claim 11, wherein said secondary dewatering step comprises vacuum filtration.

13. The process of claim 9, wherein X is about 2 to 5 and the total number of carbon atoms in $R_1$, $R_2$ and $R_3$ is about 10 to 15.

14. The process of claim 10, wherein said dewatering aid is added in an amount of from about 2 pounds to about 5 pounds/ton of scrubber sludge.

15. The process of claim 14, wherein said primary dewatering step comprises treating said scrubber sludge in a thickener.

16. The process of claim 15, wherein said secondary dewatering step comprises vacuum filtration.

17. The process of claim 16, wherein said flue gas is produced by an industrial boiler and wherein said scrubbing liquor comprises an aqueous slurry of lime and fly ash.

18. The process of claim 17, wherein said scrubber sludge comprises an aqueous slurry of calcium sulfate, calcium sulfite and fly ash.

19. The process of claim 18, wherein said hydrocarbon solvent is kerosene.

20. The process of claim 19, wherein said dewatering aid has the formula $C_{13}H_{27}O(CH_2CH_2O)_3H$.

21. A flue gas desulfurization process comprising in sequence:
 (1) contacting sulfur dioxide-containing flue gas with scrubbing liquor to remove sulfur dioxide therefrom and produce scrubber sludge,
 (2) subjecting said scrubber sludge to primary dewatering,
 (3) adding to said scrubber sludge an effective amount as a dewatering aid, polyethylene glycol in liquid hydrocarbon solvent, in an amount of from about 0.5 pounds to about 15 pounds/ton of said scrubber sludge, and
 (4) subjecting said scrubber sludge to secondary dewatering.

* * * * *